(12) United States Patent
Borg (10) Patent No.: US 8,226,308 B1
(45) Date of Patent: Jul. 24, 2012

(54) ERGONOMIC KEYBOARD WITH DIVIDED KEYS

(76) Inventor: Alfred Saviour Borg, Concord, NC (US)

( * ) Notice: Subject to any disclaimer, the term of this patent is extended or adjusted under 35 U.S.C. 154(b) by 992 days.

(21) Appl. No.: 12/114,802

(22) Filed: May 4, 2008

Related U.S. Application Data (60) Provisional application No. 60/916,119, filed on May 4, 2007.

(51) Int. Cl.
*B41J 5/00* (2006.01)
(52) U.S. Cl. .......... 400/486; 400/488; 400/489; 341/22; 341/29
(58) Field of Classification Search .................. 400/486, 400/489; 341/229
See application file for complete search history.

(56) References Cited

U.S. PATENT DOCUMENTS

| | | | | |
|---|---|---|---|---|
| 5,228,791 | A * | 7/1993 | Fort | 400/489 |
| 5,311,210 | A * | 5/1994 | O'Brien et al. | 345/168 |
| 5,367,298 | A * | 11/1994 | Axthelm | 341/22 |
| 5,673,040 | A * | 9/1997 | Hargreaves et al. | 341/22 |
| 5,689,253 | A * | 11/1997 | Hargreaves et al. | 341/22 |
| 5,731,808 | A * | 3/1998 | Gaither | 345/168 |
| 5,775,822 | A * | 7/1998 | Cheng | 400/489 |
| 6,984,081 | B1 * | 1/2006 | Goldstein et al. | 400/492 |
| 2005/0180794 | A1 * | 8/2005 | Parkinson | 400/486 |

* cited by examiner

*Primary Examiner* — Matthew G Marini
(74) *Attorney, Agent, or Firm* — Michael D. Eisenberg (57) ABSTRACT

The keyboard of the present invention provides an ergonomic layout having a configuration divided into two halves, with half the standard keys normally associated with a user's left hand positioned on the left side of the board while the other keys normally associated with a user's right hand are positioned on the right side of the board, the centers being shoulder width apart. The spacing enables users to type comfortably with keystrokes that feel natural and correct. For example, the left parenthesis button may be positioned on the left side while the right parenthesis may be positioned on the right side.

6 Claims, 7 Drawing Sheets

ERGONOMIC KEYBOARD WITH DIVIDED KEYS

CROSS-REFERENCES TO RELATED APPLICATIONS

This application claims priority from U.S. Provisional Application Ser. No. 60/916/119 filed May 4, 2007, which is hereby incorporated herein by reference in the respective in its entirety.

TECHNICAL FIELD

The present invention relates to keyboards, and more particularly, some embodiments relate to a keyboard with a configuration of keys to provide the user with a more efficient way to type.

BACKGROUND OF THE INVENTION

The subject invention generally relates to a new computer keyboard configuration that provides users with increased comfort. The configuration of the keyboard allows users a more efficient and natural way to type.

The keyboard of the subject invention permits computer users a more efficient and less stressful way to type. The keyboard provides comfort in that key spacing on the board is at shoulder width, allowing for natural movements. The keyboard provides computer users with an improved way to type, as it will reduce strain on the body.

Many computer users complain of constant back and neck pain after spending time typing at a desk or workstation. The inefficient style of the keyboard causes a user to squeeze his arms together to type, which can also negatively impact the muscles of the back and neck. This stress and strain also affects the output of work. Without breaks from typing, a user can become fatigued easily, which can increase mistakes. Therefore, there is a need for a keyboard that provides users with a more comfortable, user-friendly configuration of keys.

BRIEF SUMMARY OF EMBODIMENTS OF THE INVENTION

According to one embodiment of the invention, a keyboard is configured so that when the hands of a typical user are positioned over the keys for typing, the hands are space apart the shoulder width of the typical user. The keyboard is also configured to have keys associated with a left half of a left right character pair, such as curly, square, and angle brackets and parenthesis, positioned on the left portion of the keyboard while having the keys associated with the right halves of left right pairs on the right portion of the keyboard.

The keyboard may be positioned on a single frame having left and right portions. The keyboard has a left set of keys disposed on the left portion and a right set of keys disposed on the right portion. The centers of the left and right sets of keys may be positioned to be spaced apart the shoulder width of a typical user.

In a variant of the keyboard, the left set of keys comprises a left half of a QWERTY keyboard configuration and the right set of keys comprises a right half of the QWERTY keyboard configuration.

In another variant, the left set of keys comprises at least three rows and five columns of keys and the right set of keys comprises at least three rows and five columns of keys. The keys have indicia printed thereon corresponding to a character generated by the keyboard when the corresponding key is depressed.

In a further variant of the keyboard, a center set of keys disposed between the left and right sets. The center set of keys may comprise an numeric keypad, dedicated directional arrow keys or a combination of both.

In still another variant, the keys in the left, right, and center sets have a first spacing between the keys within the sets. The center set of keys may be spaced a distance a part from the left and right sets greater than the first spacing between the keys of the sets.

In yet a further variant, a modifier set of keys comprises a SHIFT key, a CTRL key, and an ALT key. The SHIFT, CTRL and ALT keys may be arranged adjacent to one another and the SHIFT key may be disposed above both the CTRL and ALT keys. The CTRL and ALT keys are disposed lateral to each other in a row. The keyboard may have a second modifier set and the keyboard may have a modifier set disposed adjacent the left set and the second modifier set disposed adjacent the right set and both modifier sets are disposed between the left and right sets of keys.

In another variant of the keyboard, a beta set of keys may comprise a CAPS LOCK key, an ENTER key, a NEW LINE key, and a FORWARD TAB key configured to only generate a FORWARD TAB function. The CAPS LOCK key, ENTER key, and NEW LINE key may be disposed in a first row and the FORWARD TAB key may be disposed below the first row. The CAPS LOCK key may include a light that activates when the CAPS LOCK key is on and the light is off when the CAPS LOCK key is off.

In a further variant, a gamma set of keys may comprise a BACKSPACE key, an ENTER key, a NEW LINE key, and a BACKWARD TAB key configured to only generate the backward tab function. The BACKSPACE key, ENTER key, and NEW LINE key may be disposed in a second row and the BACKWARD TAB key may be disposed below the second row.

In yet another variant, the beta set is disposed adjacent to and above the left set and the gamma set is disposed adjacent to and above the right set of keys.

In still a further variant of the keyboard, two SPACE BAR keys each are disposed below a bottom row in the left and right sets of keys.

In another variant, the left half of the QWERTY keyboard configuration comprises the keys: Q, W, E, R, T, A, S, D, F, G, Z, X, C, V, B. The right half of the QWERTY keyboard configuration comprises the keys: Y, U, I, O, P, H, J, K, L, N, M. The left set comprises a plurality of left character keys and the right set comprises a plurality of right character keys. In one example, left character keys may comprise a left parenthesis, (, a left curly bracket, {, a left square bracket, [, and a left angle bracket, <, and the right keys may comprise a right curly bracket, }, a right square bracket, ], a right angle bracket, >, right parenthesis, ).

In a further variant of the keyboard, the left set further comprises the following keys: 1, 2, 3, 4, 5, !, @, #, $, %, ", ', -, _, \ and the right set further comprises the following keys: 6, 7, 8, 9, 0, ^, &, *, ", ', -, _, |, /, ?, comma, period.

In yet another variant, a keyboard comprises a frame having left and right portions. A left set of keys are disposed on the left portion and may comprise a row having a CAPS LOCK key, an ENTER key, and a NEW LINE key. The left set may have middle rows containing keys arranged in a left half of a QWERTY keyboard arrangement. The left set may have a FORWARD TAB key configured to only generate a forward tab function. The left set may have a set of left character keys and a SPACE BAR key. A right set of keys are disposed on the right portion. The right set may comprise a row having a BACKSPACE key, an ENTER key, and a NEW LINE key. The right set has middle rows containing keys arranged in a right half of a QWERTY keyboard arrangement. The right set has a BACKWARD TAB key configured to only generate a backward tab function. The right set has a set of right character keys and a SPACE BAR key. A center set of keys may be disposed between the left and right sets of keys.

In still a further variant, the keyboard comprises two sets of a SHIFT key, a CTRL key, and an ALT key. The SHIFT, CTRL, and ALT keys are disposed adjacent one another and the two sets are disposed on either side of the center set of keys. Dedicated directional arrow keys may be disposed in an upper right hand corner of the keyboard.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The keyboard of the present invention provides an ergonomic layout having a split format in that half the standard keys are positioned on the left side of the board while the other half are positioned on the right side of the board, shoulder width apart. This spacing enables users to type comfortably with keystrokes that feel correct. For example, the left parenthesis button will be positioned on the left side while the right parenthesis will be positioned on the right.

The center of the keyboard can feature arrows, number pad, other keys or no keys for ease in use. Other styles may be utilized. The shape, size, color, and style of the keyboard can be varied without departing from the principles of the invention and can be used with any type of computer system.

The present invention is directed toward a keyboard configured in a more natural way for the typical user. In one embodiment, when the hands of a typical user are positioned over the keys for typing, the hands are space apart the shoulder width of the typical user. The keyboard may also be configured to have keys associated with a left half of a left right character pair, such as curly, square, and angle brackets and parenthesis, positioned on a left portion of the keyboard while having the keys associated with the right halves of left right pairs on the right portion of the keyboard.

Referring to FIGS. 1, 2, and 3A-C, in one embodiment, the keyboard 10 may be positioned on a single frame 12 having left 3A and right 3C portions. The keyboard has a left set of keys disposed on the left portion and a right set of keys disposed on the right portion. The centers of the left and right sets of keys may be positioned to be spaced apart the shoulder width of a typical user.

In a variant of the keyboard, the left set of keys comprises a left half of a QWERTY keyboard configuration and the right set of keys comprises a right half of the QWERTY keyboard configuration.

Figure 1:
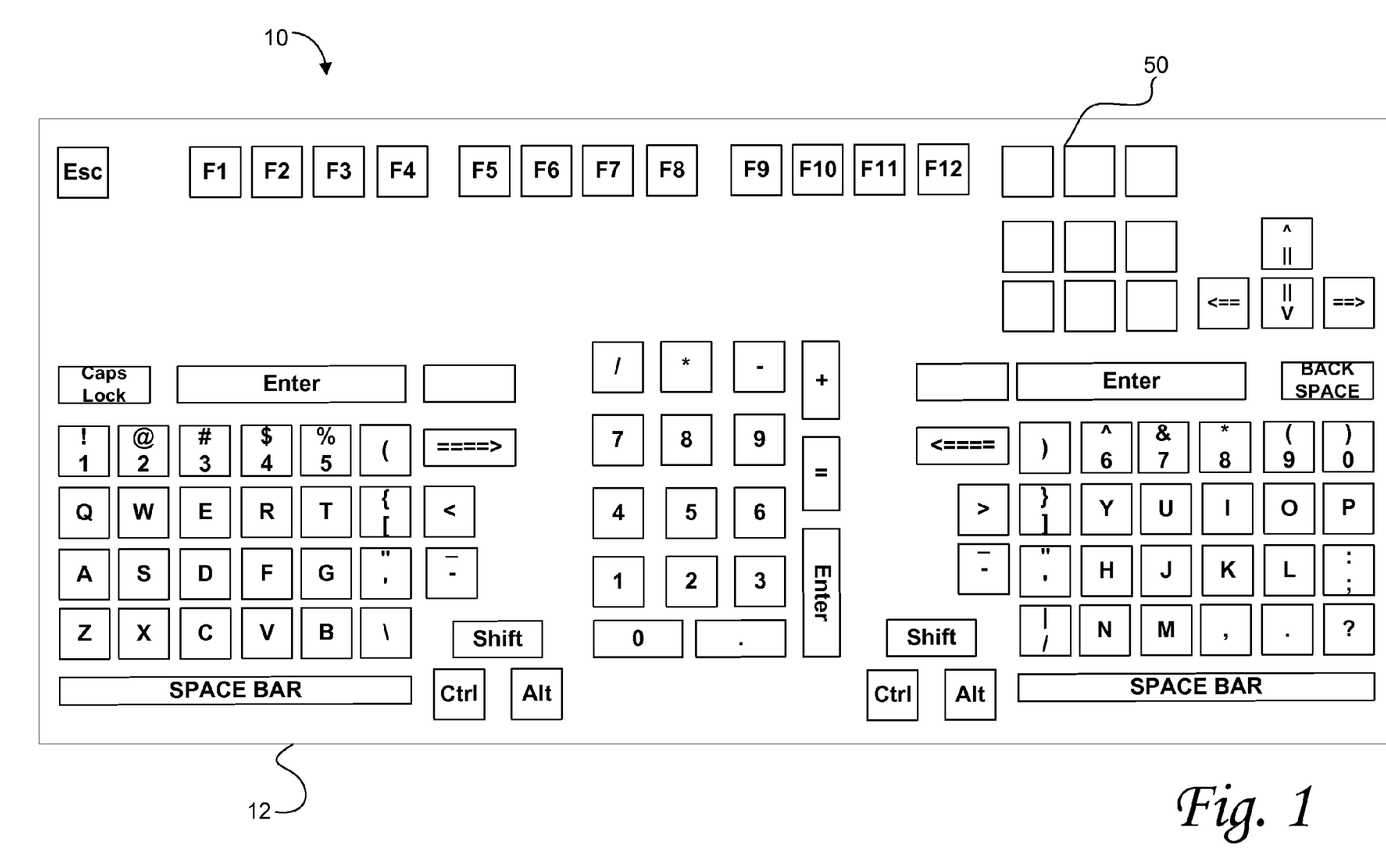
FIG. 1 is a plan view of a preferred keyboard in accordance with the principles of the invention.
Figure 2:
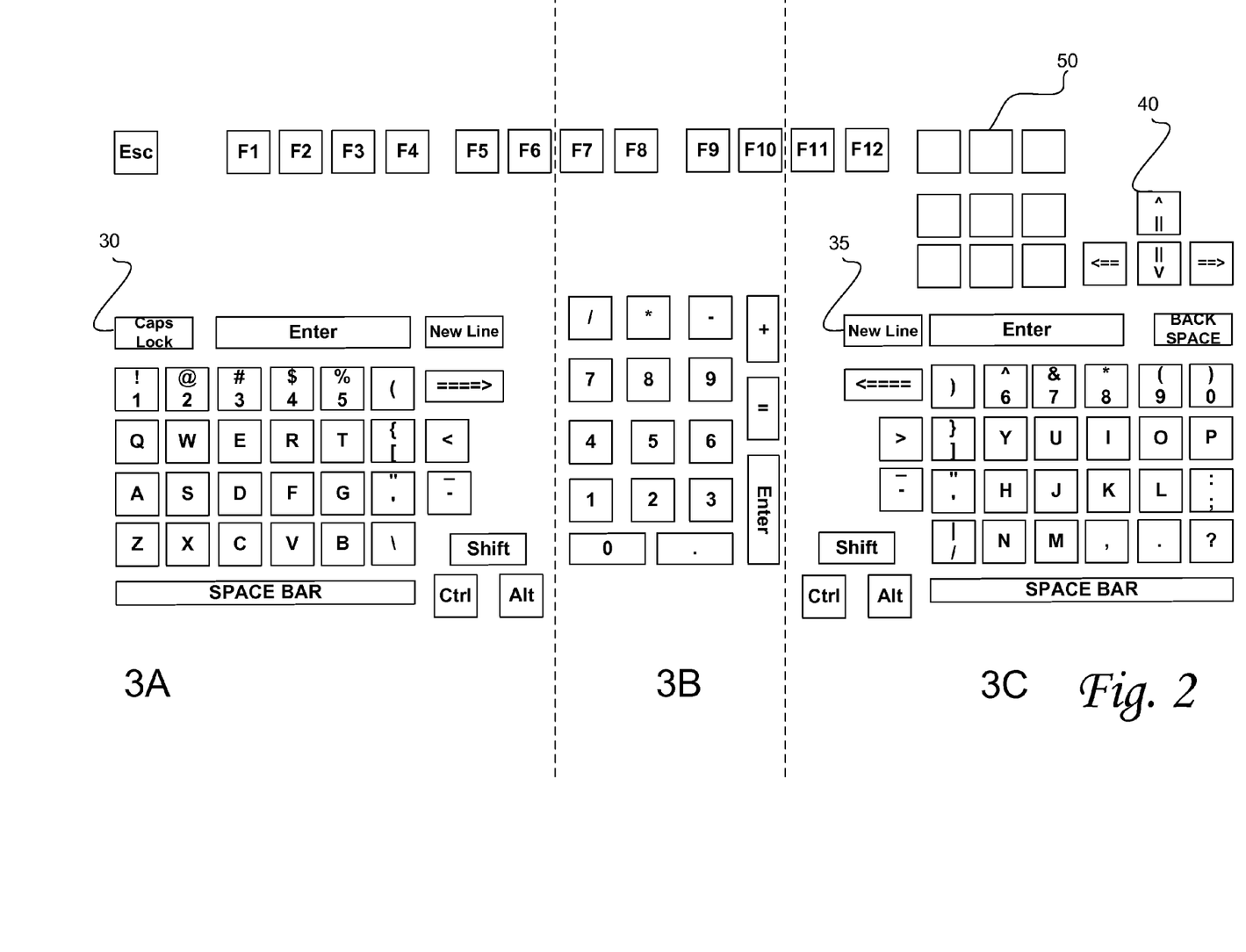
FIG. 2 is a plan view of a the keyboard in accordance with the principles of the invention.

The keyboard may also have the typical function keys disposed on a top portion of the keyboard, for example, Esc, F1, F2, F3, F4, F5, F6, F7, F8, F9, F10, F11, F12. The keyboard may also include the keys 50 Print Screen-Sys Req, Scroll Lock, Pause-Break, Insert, Home, Page Up, Page Down, End, and Delete.

In another variant, the left set of keys comprises at least three rows and five columns of keys and the right set of keys comprises at least three rows and five columns of keys. The keys have indicia printed thereon corresponding to a character generated by the keyboard when the corresponding key is depressed.

Figure 3A:
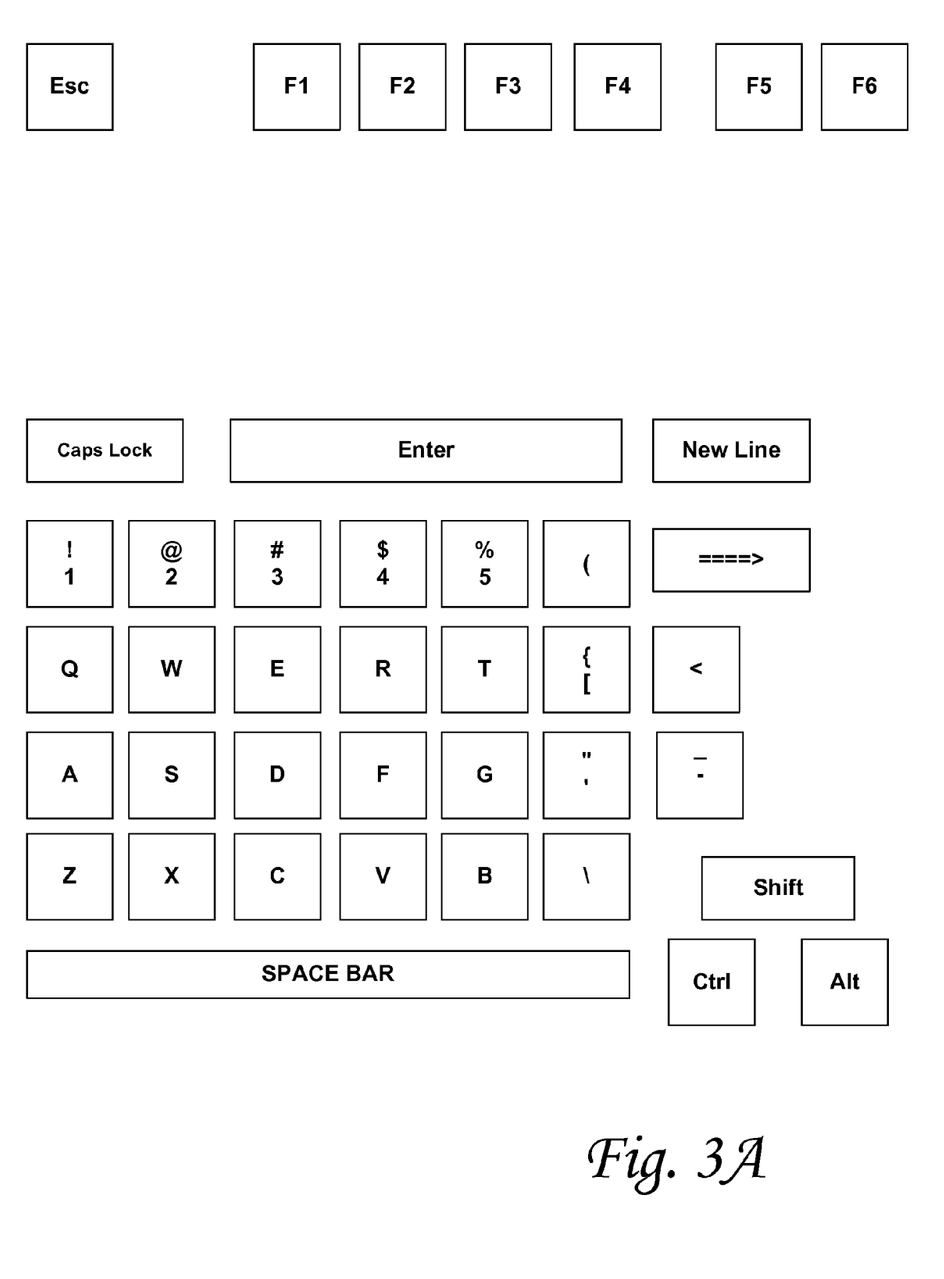
FIG. 3A is a plan view of the area 3A in FIG. 2.
Figure 3B:
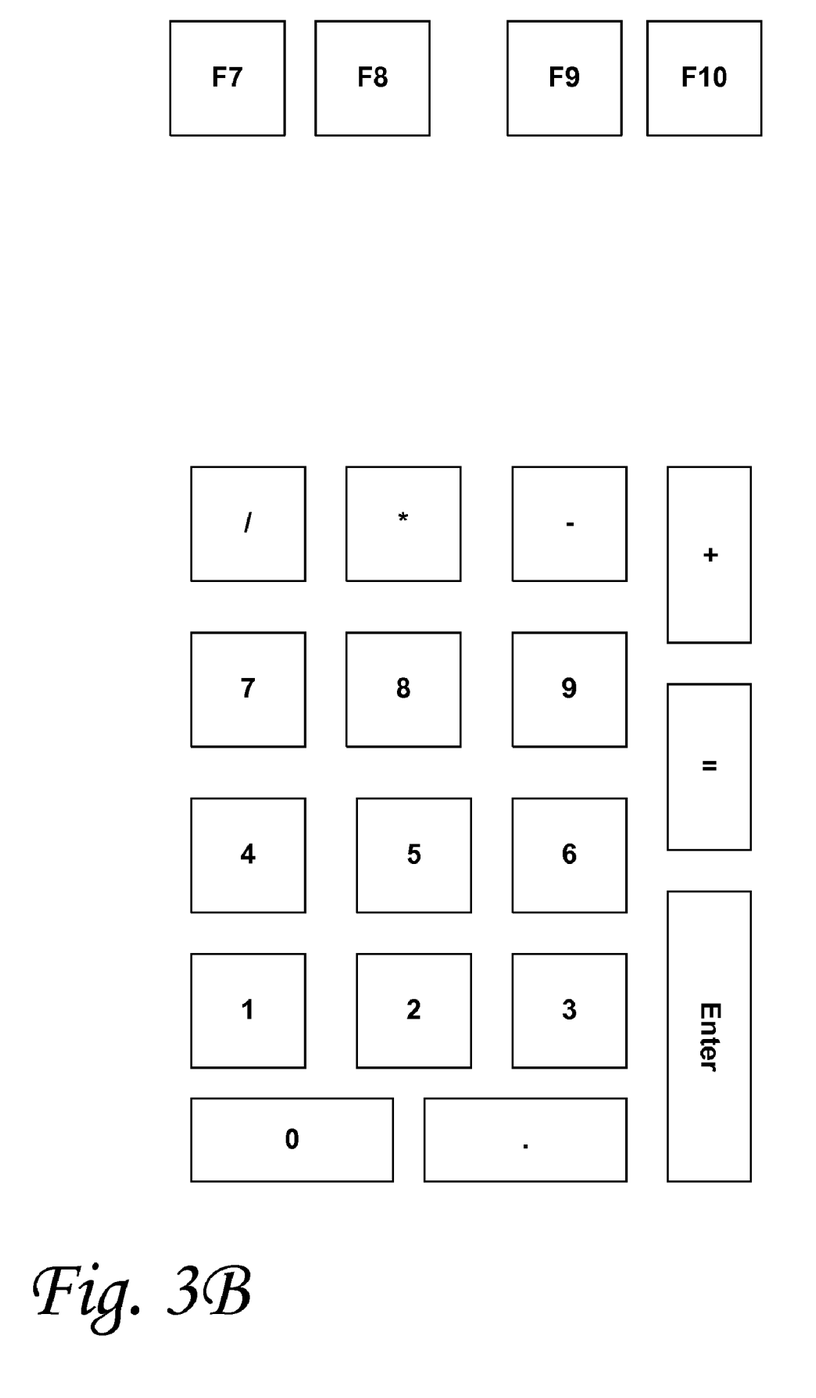
FIG. 3B is a plan view of the area 3B in FIG. 2.
Figure 3C:
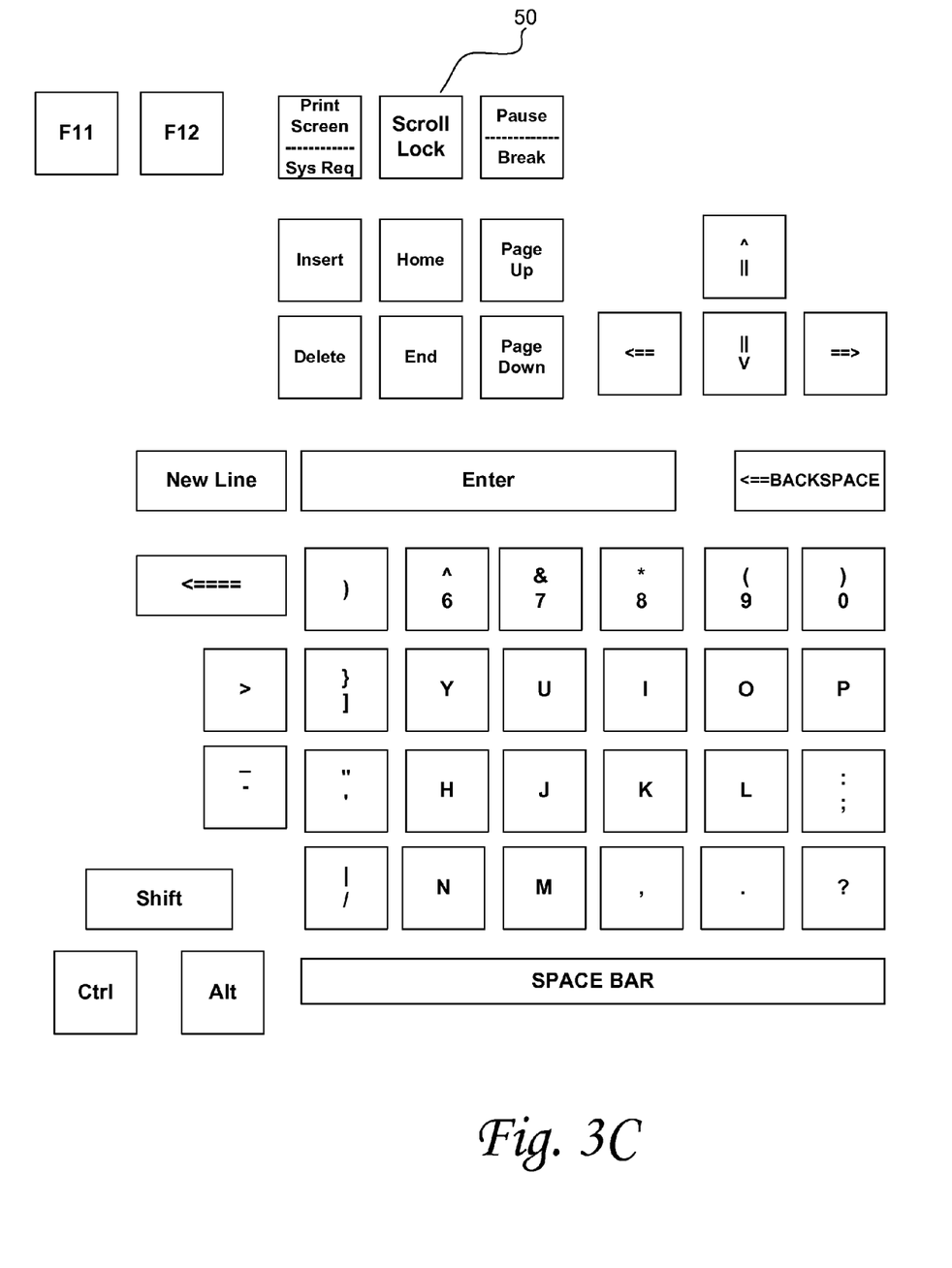
FIG. 3C is a plan view of the area 3C in FIG. 2.

In a further variant of the keyboard, referring to FIG. 3B, a center set of keys disposed between the left and right sets. The center set of keys may comprise an numeric keypad, dedicated directional arrow keys or a combination of both. The center set may comprise the keys: 1, 2, 3, 4, 5, 6, 7, 8, 9, 0, period, /, *, -, +, Enter, =.

In still another variant, the keys in the left, right, and center sets have a first spacing between the keys within the sets. The center set of keys may be spaced a distance a part from the left and right sets greater than the first spacing between the keys of the sets.

Figure 4:
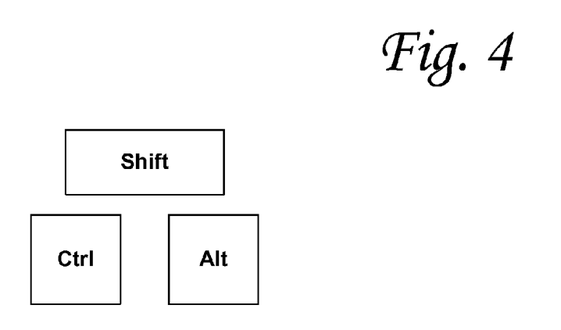
FIG. 4 is a plan view of a modifier set of keys, having SIFT, CTRL and ALT keys.

In yet a further variant, referring to FIG. 4, a modifier set of keys comprises a SHIFT key, a CTRL key, and an ALT key. The SHIFT, CTRL and ALT keys may be arranged adjacent to one another and the SHIFT key may be disposed above both the CTRL and ALT keys. The CTRL and ALT keys are disposed lateral to each other in a row. Referring to FIG. 2, the keyboard may have a second modifier set and the keyboard may have a modifier set disposed adjacent the left set and the second modifier set disposed adjacent the right set and both modifier sets are disposed between the left and right sets of keys.

Figure 5:
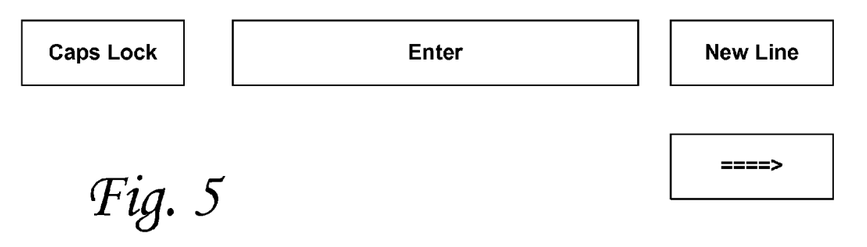
FIG. 5 is a plan view of a beta set of keys having a CAPS LOCK, ENTER, NEW LINE, and FORWARD TAB keys.

In another variant of the keyboard, referring to FIG. 5, a beta set of keys may comprise a CAPS LOCK key, an ENTER key, a NEW LINE key, and a FORWARD TAB key configured to only generate a FORWARD TAB function. Referring to FIG. 2, the CAPS LOCK key, ENTER key, and NEW LINE key may be disposed in a first row 30 and the FORWARD TAB key may be disposed below the first top row.

Figure 6:
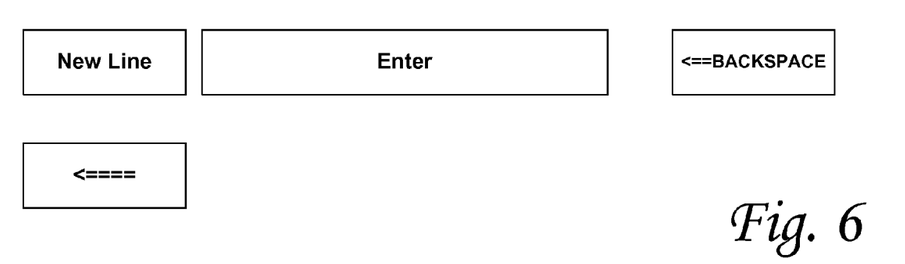
FIG. 6 is a plan view of a gamma set of keys having a NEW LINE, ENTER, BACKSPACE and BACKWARD TAB keys.

In a further variant, referring to FIG. 6, a gamma set of keys may comprise a BACKSPACE key, an ENTER key, a NEW LINE key, and a BACKWARD TAB key configured to only generate the backward tab function. Referring to FIG. 2, the BACKSPACE key, ENTER key, and NEW LINE key may be disposed in a second top row and the BACKWARD TAB key may be disposed below the second row 35.

In yet another variant, the beta set is disposed adjacent to and above the left set and the gamma set is disposed adjacent to and above the right set of keys.

In still a further variant of the keyboard, two SPACE BAR keys each are disposed below a bottom row in the left and right sets of keys.

In another variant, the left half of the QWERTY keyboard configuration comprises the keys: Q, W, E, R, T, A, S, D, F, G, Z, X, C, V, B. The right half of the QWERTY keyboard configuration comprises the keys: Y, U, I, O, P, H, J, K, L, N, M. The left set comprises a plurality of left character keys and the right set comprises a plurality of right character keys. In one example, left character keys may comprise a left parenthesis, (, a left curly bracket, {, a left square bracket, [, and a left angle bracket, <, and the right keys may comprise a right curly bracket, }, a right square bracket, ], a right angle bracket, >, right parenthesis, ).

In a further variant of the keyboard, the left set further comprises the following keys: 1, 2, 3, 4, 5, !, @, #, $, %, ", ', -, _, \ and the right set further comprises the following keys: 6, 7, 8, 9, 0, ^, &, *, ", ', -, _, |, /, ?, comma, period.

In yet another variant, still referring to FIGS. 1-6, a keyboard comprises a frame 12 having left 3A and right 3C portions. A left set of keys are disposed on the left portion and may comprise a row having a CAPS LOCK key, an ENTER key, and a NEW LINE key. The left set may have middle rows containing keys arranged in a left half of a QWERTY keyboard arrangement. The left set may have a FORWARD TAB key configured to only generate a forward tab function. The left set may have a set of left character keys and a SPACE BAR key. A right set of keys are disposed on the right portion. The right set may comprise a row having a BACKSPACE key, an ENTER key, and a NEW LINE key. The right set has middle rows containing keys arranged in a right half of a QWERTY keyboard arrangement. The right set has a BACKWARD TAB key configured to only generate a backward tab function. The right set has a set of right character keys and a SPACE BAR key. A center set of keys may be disposed between the left and right sets of keys in a center portion 3B.

Figure 7:
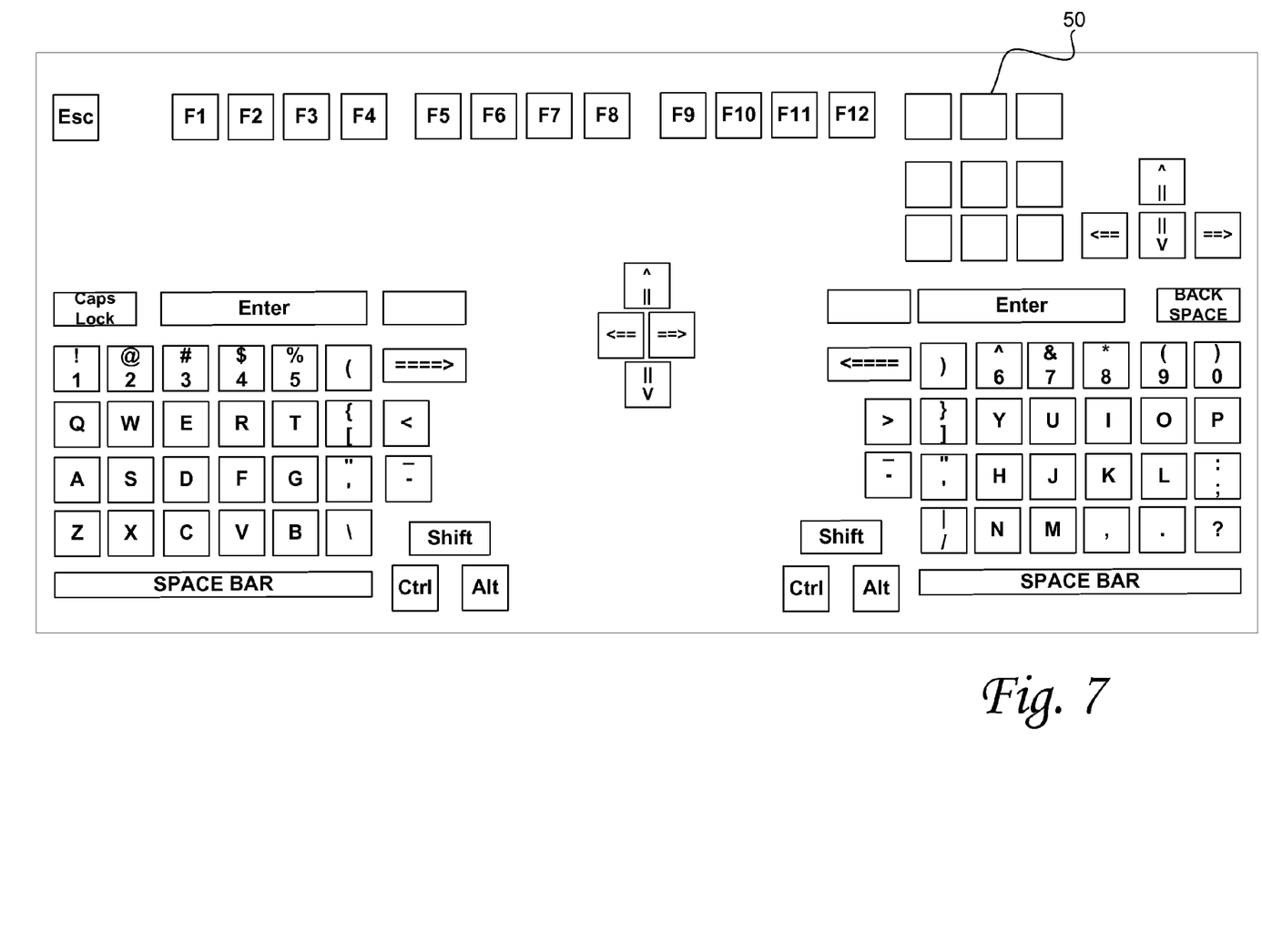
FIG. 7 is a plan view of an alternative embodiment having dedicated directional keys disposed in the center section.

In still a further variant, the keyboard comprises two sets of a SHIFT key, a CTRL key, and an ALT key. The SHIFT, CTRL, and ALT keys are disposed adjacent one another and the two sets are disposed on either side of the center set of keys. Dedicated directional arrow keys 40 may be disposed in an upper right hand corner of the keyboard. In an alternative embodiment, illustrated in FIG. 7, the dedicated directional keys may be disposed in the center portion 3B of the keyboard.

In yet a further variant, a keyboard is configured to have keys associated with a left half of a left right character pair, such as curly, square, and angle brackets and parenthesis, positioned on the left portion of the keyboard while having positioned on a left portion of the keyboard and keys associated with a right half of a left right character pair on the right portion of the keyboard.

Other embodiments may include other keys and functions that may be incorporated into the While various embodiments of the present invention have been described above, it should be understood that they have been presented by way of example only, and not of limitation Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether CTRL logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Some symbols referred to in this document are defined as follows:
! Exclamation point
@ At sign
Number sign
$ Dollar Sign
% Percent
^ caret
& Ampersand
* Asterisk
( Left Parenthesis
) Right parenthesis
_ Underscore
- Dash
{ Left curly bracket
} Right curly bracket
[ Left square bracket
] Right square bracket
| Vertical bar
\ Backslash
/ Slash mark
< Left angle bracket
> Right angle bracket
, Comma
. Period
? Question mark
: Colon
; Semicolon
' Apostrophe
" Double quote
+ Plus sign
= Equal sign
~ Tilde
Grave accent

What is claimed is:

1. A keyboard, comprising:
a single frame having left and right portions;
a left set of keys disposed on the left portion; and
a right set of keys disposed on the right portion;
a center set of keys disposed between the left and right sets, comprising a numeric keypad;
wherein the left set of keys comprises a left half of a QWERTY keyboard configuration and the right set of keys comprises a right half of the QWERTY keyboard configuration;
the left set of keys comprises at least three rows and five columns of keys and the right set of keys comprises at least three rows and five columns of keys, and the keys having indicia printed thereon corresponding to a character generated by the keyboard when the corresponding key is depressed;
wherein the keys in the left, right, and center sets have a first spacing between the keys within the sets and the center set of keys is spaced a distance a part from the left and right sets greater than the first spacing between the keys of the sets;
two sets of three keys clustered together and arranged with two keys in a row and a third key above the two keys, a cluster of three keys positioned between the center keys and left keys and a cluster of three keys positioned between the center keys and the right keys and both clusters in line with the bottom two rows of the right and left keys, the clusters spaced apart from the left and right sets;
wherein centers of the left and right sets of keys are positioned to be spaced apart the shoulder width of a typical user;
a beta set of keys comprising:
a CAPS LOCK key;
an ENTER key;
a NEW LINE key; and
a FORWARD TAB key configured to only generate a FORWARD TAB function;
wherein the CAPS LOCK key, ENTER key, and NEW LINE key are disposed in a first top row and the top row contains exactly three keys comprising the CAPS LOCK key, ENTER key, and NEW LINE and the FORWARD TAB key is disposed below the first top row;
wherein the beta set is disposed adjacent to and above the left set.

2. The keyboard of claim 1, further comprising a gamma set of keys comprising:
a BACKSPACE key;
an ENTER key;
a NEW LINE key; and
a BACKWARD TAB key configured to only generate the backward tab function;
wherein the a BACKSPACE key, ENTER key, and NEW LINE key are disposed in a second top row and the second top row contains exactly three keys comprising the BACKSPACE key, ENTER key, and NEW LINE key and the BACKWARD TAB key is disposed below the second top row;

wherein the gamma set is disposed adjacent to and above the right set of keys.

3. The keyboard of claim 1, wherein the bottom rows of the left and right sets of keys contain exactly one key, and each bottom row comprises a SPACE BAR key.

4. The keyboard of claim 1, further comprising two sets of modifier keys comprising:
  a SHIFT key;
  a CTRL key; and
  an ALT key;
  wherein the SHIFT, CTRL and ALT keys are arranged adjacent to one another and the SHIFT key is disposed above both the CTRL and ALT keys and the CTRL and ALT keys are disposed lateral to each other in a row.

5. A keyboard, comprising:
  a single rigid frame having left and right portions;
  a left set of keys disposed on the left portion, the left set comprising:
    a top row having precisely a CAPS LOCK key, an ENTER key, and a NEW LINE key and no other keys;
    middle rows containing keys arranged in a left half of a QWERTY keyboard arrangement;
    a FORWARD TAB key configured to only generate a forward tab function;
    a set of left character keys; and
    a bottom row having precisely a SPACE BAR key and no other keys;
  a right set of keys disposed on the right portion, the right set comprising:
    a row having a BACKSPACE key, an ENTER key, and a NEW LINE key;
    middle rows containing keys arranged in a right half of a QWERTY keyboard arrangement;
    a BACKWARD TAB key configured to only generate a backward tab function;
    a set of right character keys; and
    a bottom row having precisely a SPACE BAR key and no other keys; and
  a center set of keys disposed between the left and right sets of keys;
  wherein centers of the left and right sets of keys are positioned to be spaced apart the shoulder width of a typical user.

6. The keyboard of claim 5, wherein the keyboard comprises:
  two sets of:
    a SHIFT key;
    a CTRL key; and
    an ALT key;
    wherein the SHIFT, CTRL, and ALT keys are disposed adjacent one another;
  wherein the two sets are disposed on either side of the center set of keys.

* * * * *